Sept. 8, 1936. S. S. MATTHES 2,053,965
TROLLEY WIRE FROG
Filed Dec. 5, 1934
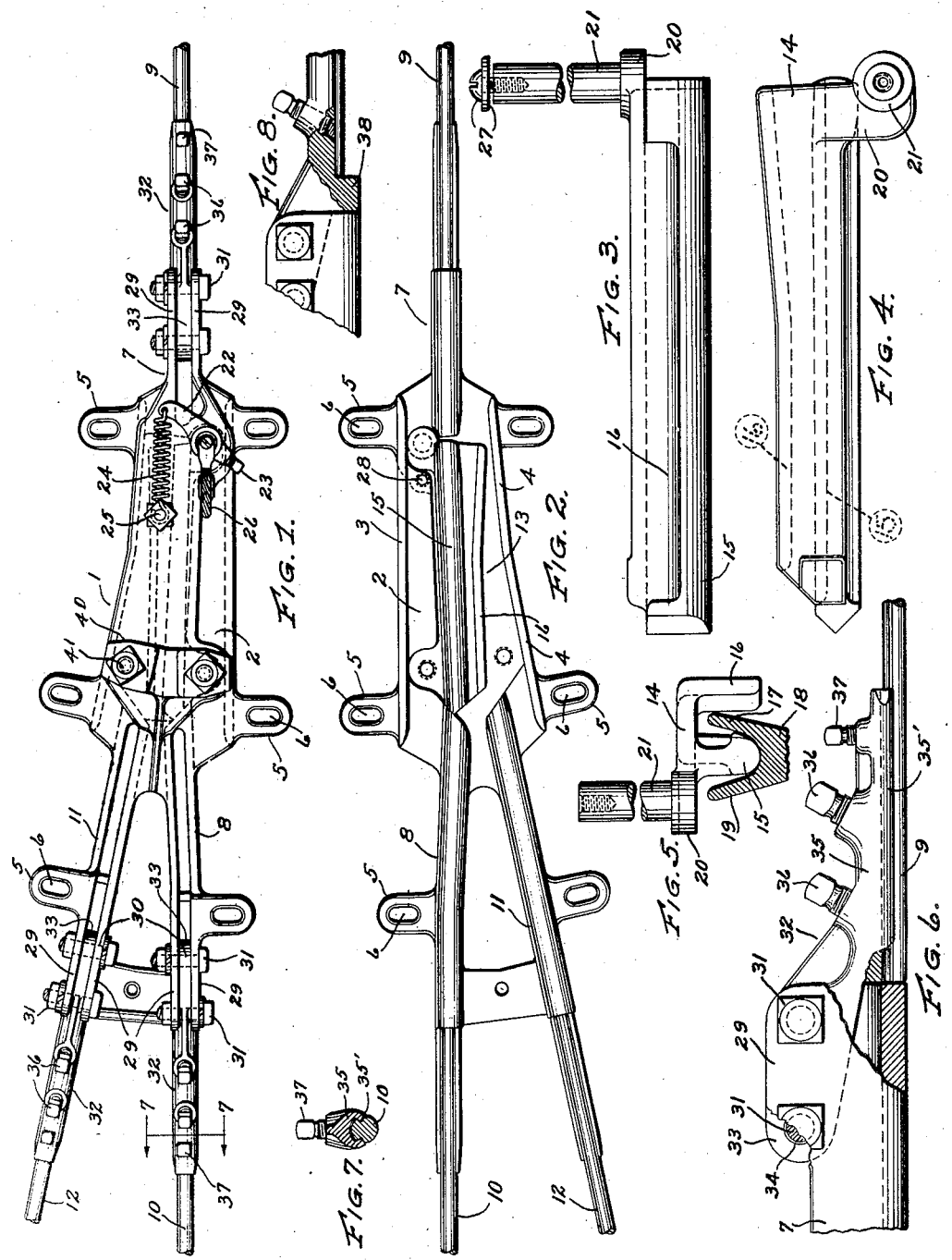
Inventor
SAMUEL S. MATTHES
By
Attorney Patented Sept. 8, 1936

2,053,965

UNITED STATES PATENT OFFICE 2,053,965

TROLLEY WIRE FROG

Samuel S. Matthes, Mansfield, Ohio, assignor to The Ohio Brass Company, Mansfield, Ohio, a corporation of New Jersey Application December 5, 1934, Serial No. 756,060

17 Claims. (Cl. 191—38)

My invention relates to overhead trolley wire devices and particularly to devices for guiding the current collector at turnout points and known as trolley frogs or switches.

The object of my invention is to provide a switch which will have a positive operation in one direction but which may be moved to guide the current collector in another direction through side pressure or "drag" of the current collector in passing through the frog.

Another object of my invention is to provide the end portions of the frog with means whereby the trolley wire may be attached thereto without the necessity of bending the wire, and providing a uniform and uninterrupted passage from the trolley wire to the device, and vice versa.

The method of attaching the trolley wire to the device is not limited to use with trolley frogs or switches but may be used with section insulators insulated and live crossings, etc.

My invention resides in the new and novel construction, combination and relation of the parts described in this specification and shown in the drawing forming a part of the specification.

In the drawing:—

Fig. 1 is a top view of my invention.

Fig. 2 is a bottom view of my invention.

Fig. 3 is a side view of the deflector or tongue which I employ.

Fig. 4 is a top view of Fig. 3.

Fig. 5 is an end view of Fig. 3.

Fig. 6 is an enlarged view in partial section of the arm of my invention showing the manner in which the trolley wire is attached to the device and the means therefor.

Fig. 7 is an enlarged section on the line 7—7 of Fig. 1.

Fig. 8 is a modification of the structure shown in Fig. 6.

In the preferred embodiment of my invention I employ a body member 1 having a plate portion 2 with angularly disposed side flanges 3 and 4 forming a trough-like construction. The body 1 is also provided with projecting lugs 5 having openings 6 by means of which the device may be supported as by means of span wires or cables.

Projecting in opposite directions from the portion 2 are arms 7 and 8 to which are attached the adjacent ends 9 and 10 of the trolley wire and which are usually in alignment. Also projecting from the portion 2 is a branch arm 11 to which is secured the end 12 of the branch trolley wire.

Pivotally mounted upon the portion 2 and between the flanges 3 and 4 is a tongue or deflector 13 which will guide a passing current collector across the pan from trolley wire 9 to wire 10 or vice versa but which can be automatically moved by side pressure of the current collector to guide the collector across the device from the trolley wire 9 to the trolley wire 12 providing the vehicle to which the current collector is attached moves laterally in the direction taken by the branch trolley wire 12 at the proper time, and this operation is soon learned by the one in charge of the vehicle in case of the trolley bus. My invention may be used in connection with either a trolley bus which operates without rails or in connection with trolley cars operating on rails. In the former case, the bus operator will swing his car in the direction of the turnout at such a time as to produce a side drag upon the member 13 through the pressure thereon of the current collector. In the case of the trolley car the direction of the vehicle is directed through the medium of the track switch and the side pressure of the current collector upon the member 13 will operate the same to the turnout position the same as in the case of bus operation.

The tongue or deflector 13 comprises a body having a portion 14 positioned adjacent the portion 2 and projecting from the portion 14 is a guide member 15 extending between the arms 7 and 8, or 7 and 11, and cooperates with the groove of the current collector to guide the same across the device. Also projecting from the part 14 is a flange 16 which is spaced from the guide 15 and is arranged to be engaged by the flange 17 of the current collector 18.

The flange 16 has two portions, one of which is spaced farther from the guide 15 than the other portion and permits easy entrance of the flange to the space between the parts 15 and 16 when the collector is passing from the arm 7 to the arm 8, and it is while the collector is moving in that direction that the tongue 13 is deflected from the main line position if desired. While the flange 16 may be said to be curved or bent, it is also in general parallel to the guide 15.

The object of the flange 16 is to permit of greater reliability in the operation of the tongue than is the case with other devices on the market where only a tongue having the guide 15 is used.

I find that there is a considerable variation between current collecting devices made by various manufacturers as to the width of the groove and width of the wheel across the flange and as to the depth of the groove, and with such variations it is impossible for a frog provided with a tongue of the ordinary construction to act as quickly and positively in moving from the main line position to the branch line position under side pressure of the current collector moving at high speed, as there is considerable lost motion between the member 15 and the sides of the groove 19.

By the use of the flange 16 spaced a predetermined distance from the guide 15 I find that the reliability in operation of the device is materially increased as the flange of the collector 18 will be found to engage with the flange 16 of the tongue in many cases where the clearance between the guide 15 and the sides of the groove 19 may be large, and thus if the tongue 13 is not operated wholly by the contact between the current collector 18 and the guide 15 there is a probability that the flange 17 of the collector 18 will engage with the flange 16 of the tongue and operate the tongue or it may be operated through a combination of the engagements just referred to plus the said side pressure.

Projecting laterally from the member 14 is a lug 20 and from which projects a pivotal pin 21 which passes through an opening in the portion 2 of the device.

Mounted upon the end of the pin 21 is an operating lever 22 which is affixed thereto by means of a set screw 23. The lever 22 may cooperate with the lug 20 to hold the tongue in position upon the portion 2. To one end of the lever 22 is fastened a spring 24 having an end secured to the portion 2 by means of a fastener 25 and the tension of the spring 24 will normally and yieldingly hold the tongue 13 in the main line position as shown in Fig. 2. In order that the tongue 13 may be efficiently connected electrically to the portion 2, a flexible cable 26 is connected to the stud 21 through the medium of the screw and washer 27 and to the portion 2 by means of the screw 28. This does not interfere with the movement of the tongue and gives it a positive electrical connection with the main portion of the device.

The tongue 13 may be arranged to normally conduct the current collector from the arm 7 to the arm 11 but in that case the flange 16 will not function as stated above, and in order to maintain the tongue yieldingly in the position referred to, the lever 22 may be reversed from that shown in Fig. 1 and the pull of the spring will then yieldingly hold the tongue in position to guide the collector from the arm 7 to the arm 11.

The inner ends of the arms 8 and 11 are beveled and likewise the engaging portions therewith of the tongue 13.

The arms 7, 8, and 11 are usually U-shaped and the ends provided with the extended lips 29 which are spaced and provided with registering openings 30 in which are positioned the bolts and nuts 31.

Positioned at the end of the arm is a removable or renewable end member 32 which has a flattened and projecting lug 33 positioned between the lugs 29 and provided with openings 34 through which pass the bolts 31 for holding the end member in position with respect to the arm. The end member 32 is also provided with projecting portion 35 provided with a longitudinal groove in which is slidably positioned the end of the trolley wire (see Fig. 7). It will be noted from Figs. 6 and 7 that the trolley wire will be unbent and the end face will abut against the end face of the arm 7 and that the lower face of the arm and the trolley wire are in alignment but the lower edge 35' is above the lower edge of the arm. This is an important feature of construction, especially in the present day where high speeds are attained and smooth and unbroken operation between the current collector and overhead device will materially increase the life of the equipment and safety in operation. It is usual to have the lips of the wire groove to practically encircle the wire.

In order that the thickness of the arm adjacent the abutting end of the wire shall be no greater than the width of the projecting portion 35, the portion 33 is of less width than the portion 35.

The trolley wire 9 is held in position by means of obliquely disposed set screws 36 and relative vibration between the trolley wire and the end of the portion 35 is checked by means of the adjustable set screw 37.

The member 35 may have the wire slot extend nearly to the end of the arm and terminate at a lug portion 38, the lower surface conforming to and in alignment with the exposed surface of the trolley wire and the lower surface of the arm.

The end member 32 may be replaced very easily by end members of other construction for different shapes and sizes of wires or in case of necessity of renewal such replacement can be easily made. The end member 32 is preferably made of bronze while the body member is made of iron.

In the claims, the term "normal" is used to define the position of the tongue relative to the arms as that in which it is yieldingly held by the spring, and may be either that of connecting the arms 7 and 8 or the arms 7 and 11.

To the upper surface of the body member 1 is secured a clamp 40 by means of the bolts and nuts 41. This clamp is used to clamp the trolley wires in case the end members 32 are replaced by end members of the usual construction and similar to Patent 1,895,581 issued January 31, 1933.

Modifications of my invention will suggest themselves to those skilled in the art, but I do not wish to be limited other than by my claims.

I claim:—

1. In an overhead trolley device the combination of a member having two fixed guides projecting from the surface of said member and also projecting beyond said member at one end and a single fixed guide projecting from the surface of said member and also projecting beyond said member at the other end of said member, means on each of said guides to secure a trolley wire thereto and a movable guide pivotally mounted on the said member and arranged to normally extend between the single fixed guide and one of the two fixed guides at the other end of the said member, the said guides arranged to contact with and guide a current collector across the device, the movable guide having a rib normally aligned with the fixed guides to cooperate with the groove of the current collector and a flange spaced from the rib to engage and cooperate with the flange of the collector in crossing the device to move the movable guide from its normal position under side pressure of the collector and means to yieldingly hold the movable guide in and return it to its normal position.

2. A trolley switch comprising a member having two fixed guides projecting from one end thereof and a single fixed guide projecting from the other end thereof and in alignment with one of the two said fixed guides, means on each aforesaid guides to secure a trolley wire end thereto, a movable guide pivoted to the said member at a point adjacent the inner end of said single fixed guide and normally positioned between the inner ends of the said aligned fixed guides, means to yieldingly maintain said normal alignment, the movable guide having a rib in aligned relation to the normally aligned fixed guides and a flange substantially parallel to the guide to be engaged by the flange of a passing current collector to move the movable guide from its normal position under side pressure of the collector and guide the collector to the other of the two fixed guides.

3. A trolley switch for a current collector comprising a member having two arms projecting from one end thereof and a single arm projecting from the other end thereof and in alignment with one of the said two arms, means on each aforesaid arms to secure a trolley wire end thereto, a movable tongue pivoted to the said member at a point adjacent the inner end of said single arm and normally yieldingly held in longitudinal alignment with the said aligned arms, the movable tongue having a pair of spaced guides, one guide aligned with the aligned arms and adapted to cooperate with the groove of a current collector on a passing vehicle and the other guide to cooperate with the outer surface of the collector to move the tongue under side pressure exerted by the collector from its normal position and guide the collector to the other of the two arms.

4. A trolley switch for a current collector comprising a member having two arms projecting from one end thereof and a single arm projecting from the other end thereof and in alignment with one of the said two arms, means on each aforesaid arms to secure a trolley wire end thereto, a movable tongue pivoted to the said member at a point adjacent the inner end of said single arm and normally yieldingly held in longitudinal alignment with the said aligned arms, the movable tongue having a pair of spaced guides, one guide aligned with the aligned arms and one guide to cooperate with a current collector on a passing vehicle to exert side pressure upon the tongue to move it from its normal position to guide the collector to the other of the two arms.

5. A tongue for a trolley wire device comprising an elongated body having a pin upon which it pivots and projecting at right angles to the longitudinal axis of the body, the pin being offset laterally relative to the body, the body also having a pair of spaced flanges, one acting as a guide for a current collector and the other to be engaged by the flange on the collector to move the tongue upon its pin.

6. A guide for a trolley wire device to guide a current collector therethrough comprising an elongated body having a pin upon which it pivots and projecting at right angles to the longitudinal axis of the body, the body having a pair of longitudinally disposed flanges, one flange arranged to be engaged by the outer portion of the collector flange to exert a side pressure upon the flange to pivot the guide.

7. A switch tongue for guiding a current collector across the pan of a trolley switch comprising an elongated body, provided with means to pivotally mount the tongue on the pan and also having two spaced longitudinal flanges, one acting as a guide for the current collector and both cooperating with the collector to pivot the tongue relative to the pan through side pressure of the collector against the flanges.

8. A switch tongue for guiding a current collector across the pan of a trolley switch comprising an elongated body provided with means to pivotally mount the tongue on the pan and also having two spaced longitudinal flanges, one acting as a guide for the current collector and either flange cooperating with the collector to pivot the tongue relative to the pan through side pressure of the collector against the flanges.

9. A switch tongue for guiding a current collector across the pan of a trolley switch comprising an elongated body provided with means to pivotally mount the tongue on the pan and also having two spaced longitudinal flanges, both cooperating with the collector to pivot the tongue relative to the pan through side pressure of the collector against the flanges as the collector crosses the tongue.

10. A switch tongue for guiding a current collector across the pan of a trolley switch comprising an elongated body provided with means to pivotally mount the tongue on the pan and also having two spaced longitudinal flanges, either flange cooperating with the collector to pivot the tongue relative to the pan through side pressure of the collector against the flange as the collector crosses the tongue.

11. A switch tongue for guiding a current collector across the pan of a trolley switch comprising an elongated body provided with a pair of spaced longitudinal flanges and a pin at one end to pivotally mount the tongue on the pan, one flange acting as a guide for the collector and the other flange to be engaged by the flange of the collector to move the tongue on its pivot.

12. A switch tongue for guiding a current collector across the pan of a trolley switch comprising an elongated body provided with a pair of spaced longitudinal flanges and a projecting pin at one end offset laterally from the body, one flange spaced farther from the other flange at one end of the tongue than at the other end thereof to bring the collector into engagement with both flanges prior to the collector leaving the tongue to insure movement of the tongue.

13. A switch tongue for guiding a current collector across the pan of a trolley switch comprising an elongated body provided with a pair of spaced longitudinal flanges and a projecting pin at one end, one flange straight and extending along the body and the other flange also extending along the body but spaced unequally along its length from the other flange to insure engagement of the collector with both flanges to move the tongue prior to the collector passing the tongue.

14. A trolley wire switch for a current collector comprising a body member having two arms projecting from one end thereof and a single arm projecting from the other end thereof, means on each said arm to secure the end of a trolley wire thereto comprising a removable member secured to each arm to receive and hold the trolley wire end in fixed relation to the arm with the end of the wire abutting up against the end face of the arm and the lower surface of the wire conforming to and in alignment with lower adjacent face of the arm and means to hold the wire in position in the removable member, a movable tongue pivoted to the body member at a point adjacent to the inner end of said single arm and normally yieldingly held in longitudinal alignment with one of the said two arms, the movable tongue having a pair of spaced guides, one guide aligned with the other of the said two arms and the other guide to cooperate with a current collector on a passing vehicle to exert side pressure upon the tongue to move it from its normal position to guide the collector to the said other of the said two arms.

15. The combination with a trolley switch pan of a tongue pivotally mounted on the pan for guiding a current collector across the pan, the tongue comprising an elongated body provided with means to pivotally mount the tongue on the pan and having two spaced longitudinal flanges, either flange cooperating with the collector to pivot the tongue relative to the pan through side pressure of the collector against the flange as the collector crosses the tongue, the means to pivotally mount the tongue being positioned adjacent one end of the tongue and laterally displaced in the same direction relative to both flanges.

16. A switch tongue for guiding a current collector across the pan of a trolley switch comprising an elongated body provided with means to pivotally mount the tongue on the pan and also having two laterally spaced and diverging longitudinal flanges, either flange cooperating with the collector to pivot the tongue relative to the pan through side pressure of the collector against the flange as the collector crosses the tongue, the means to pivotally mount the tongue being positioned adjacent the end of the tongue having the greater spacing of the flanges and laterally displaced in the same direction relative to both flanges.

17. A trolley switch for a current collector comprising a body member having two arms projecting from one end thereof and a single arm projecting from the other end thereof, removable means secured to each arm to secure the end of a trolley wire thereto comprising a removable member rigidly secured to the arm to receive and hold a trolley wire end in fixed and abutting relation to the arm end with the lower wire surface exposed and conforming to and in alignment with the lower adjacent surface of the arm and means to secure the wire to the removable member, a tongue having parallel guide flanges pivotally mounted on the body member, one guide flange adapted to guide the current collector across the device in the direction normally set and the other adapted to be engaged by the collector when the normal position of the tongue is to be changed to effect such changing and yielding means to return the tongue to its normal position.

SAMUEL S. MATTHES.